United States Patent [19]
Favre et al.

[11] Patent Number: 5,421,389
[45] Date of Patent: Jun. 6, 1995

[54] TRAIN OF TIRES WITH DIRECTIONAL TREAD PATTERN AND METHOD OF MOUNTING THE TIRES ON A VEHICLE

[75] Inventors: Francois Favre, Chateaugay; Didier Martin, Chamalieres, both of France

[73] Assignee: Compagnie General Des Etablissements Michelin - Michelin & Cie, Clermont-Ferrand Cedex, France

[21] Appl. No.: 74,024

[22] Filed: Jun. 2, 1993

[30] Foreign Application Priority Data

Jun. 11, 1992 [FR] France .................. 92 07241

[51] Int. Cl.⁶ .................................. B60C 115/00
[52] U.S. Cl. .................................. 152/209 R
[58] Field of Search .................. 152/209 R, 209 D

[56] References Cited

U.S. PATENT DOCUMENTS

| | | | |
|---|---|---|---|
| 4,456,046 | 6/1984 | Miller | 152/209 R |
| 4,865,101 | 9/1989 | Williams | 152/209 R |
| 4,877,072 | 10/1989 | Fontaine | 152/209 R |
| 4,884,607 | 12/1989 | Mori | 152/209 R |
| 4,984,616 | 1/1991 | Shepler et al. | |
| 5,211,779 | 5/1993 | Tomioka et al. | 152/209 R |

FOREIGN PATENT DOCUMENTS

| | | |
|---|---|---|
| 0194069 | 9/1986 | European Pat. Off. |
| 0402303 | 12/1990 | European Pat. Off. |
| 2637547 | 4/1990 | France |
| 59-81203 | 5/1984 | Japan |

*Primary Examiner*—Adrienne C. Johnstone
*Attorney, Agent, or Firm*—Brumbaugh, Graves, Donohue & Raymond

[57] ABSTRACT

In order to minimize the disturbance to the occupants of the vehicle as a result of the noises given off by the tires of the vehicle, the tires have treads provided with "V"-shaped directional tread patterns and are mounted "vertex to the rear" on the front axle of the vehicle and "vertex to the front" on the rear axle of the vehicle.

1 Claim, 3 Drawing Sheets

TRAIN OF TIRES WITH DIRECTIONAL TREAD PATTERN AND METHOD OF MOUNTING THE TIRES ON A VEHICLE

BACKGROUND OF THE INVENTION

The present invention relates to a train of tires intended to equip a vehicle and, more particularly, tires having treads the tread patterns of which are directional, that is to say, tread patterns which are related in their design to the direction of rotation of the tires.

Train of tires as used herein means the tires necessary for the complete equipping of the vehicle.

Directional tread patterns have been known for a long time and have been used for agricultural tires or tires used on building sites or in mines. This tread pattern principle has been employed for several years with a certain amount of success in tires intended to travel at high speed, the combined characteristics of the grooves and of the ribs being selected so as to obtain the best possible compromise between the properties of adherence on the different soils encountered by the tire, the wear and endurance properties, the properties of rolling resistance and of road-holding at high speed, the properties of behavior of the vehicle on a straight line and on curves, and the properties with regard to noise.

It is known that a directional tread, the grooves and ribs of which are inclined significantly with respect to the circumferential direction of the tire, with the ends located at the center of the tread penetrating first into the region of contact between the tire and the ground, assures only a slight generation of noise. This is part of the teaching contained in FR 2 637 547 or in EP Application 0 402 303, which show so-called "V"-shaped or herringbone patterns. Now, it is in fact true that the tread patterns described generate acoustic intensity or acoustic power which is less at the front of the tire/ground contact ellipse when the recommended direction of rotation is respected. This is external noise, that is to say noise perceived outside the vehicle. This outside noise is measured either close to the tire, at the front or rear of the tire/ground contact ellipse, or "on the edge of the track" on which the test vehicle travels.

There are also so-called interior noises which are much more disturbing to the occupants of the vehicle and are greater the more the tread pattern of the tires is formed of elements which are strictly identical on the circumference. The well-known "variable pitch" technique, the circumferential lengths of the tread elements being different and determined in such a manner that the acoustic energy is distributed over a wide frequency spectrum in order to avoid resonances, permits a substantial reduction in the internal noises. As the latter are particularly influenced by the size of the tire, that is to say by the ratio of the height of the tire to the maximum axial width of the tire, by the speed of travel of the vehicle equipped, and by the location of the transverse grooves, they must be further reduced.

The studies carried out by the applicant on the sources of the noises given off by the travel of the tires and as to the manner in which these noises are transferred to the occupants of a vehicle have made it possible to obtain an improvement without increase in the level of the acoustic power given off to the outside.

SUMMARY OF THE INVENTION

In accordance with the invention, a train of tires formed of at least four tires each having a tread provided with a directional tread pattern having at least transverse grooves extending from one edge to the other of the tread and the traces of which are similar to the shape of a "V" is characterized by the fact that the tires equipping the rear axle or axles of the vehicle have a direction of rotation such that the vertices of the "V" penetrate first into the area of contact between the tire and the ground and the tires equipping the front axle or axles of the vehicle have the opposite direction of rotation, the vertices of the "V" entering into the tire/ground ellipse after the axially outer ends of the branches of the "V". In this definition, the V-shape is understood in a broad sense, as explained below.

The traces of transverse grooves are similar to the "V" shape, as that term is used herein, if they have substantially that shape, that is to say if the transverse grooves comprise two branches inclined with respect to the circumferential direction of the tire by the same angle, located on opposite sides of the equatorial plane and symmetrical with respect to said plane, the vertex of the "V" that is to say the intersection of the two branches, being then located in the same plane.

The traces of grooves will also be considered similar to the shape of a "V" if the two branches are continuous or discontinuous, that is to say formed of portions not necessarily located along the extension of each other; the same will be true if the branches are not symmetrical with respect to the equatorial plane, the two branches possibly having inclinations of different absolute value. The same will be true if the vertex or tip of the "V" is not in the equatorial plane but in a plane parallel to said plane and axially offset.

The shape of the "V" will also be satisfied if the vertex of the "V" is formed of an acute or obtuse angle, if the vertex is rounded, or if it is truncated so that the two axially inner ends of the inclined branches are connected by an axial groove portion. Traces having two inclined branches the axially inner ends of which do not join each other, whether they are offset circumferentially, axially, or both simultaneously, are also considered similar to the shape of a "V". The same is true of traces having two inclined branches which are extended axially towards the inside by axial groove portions which do not join each other.

The directional tread patterns in question having transverse "V" grooves preferably also comprise circumferential grooves, which, seen in developed view, are linear or slightly zig-zag.

DESCRIPTION OF THE DRAWINGS

The invention will be understood better by means of the accompanying drawings, which illustrate a nonlimitative embodiment, in which drawings.

DESCRIPTION OF PREFERRED EMBODIMENTS

Figure 1:
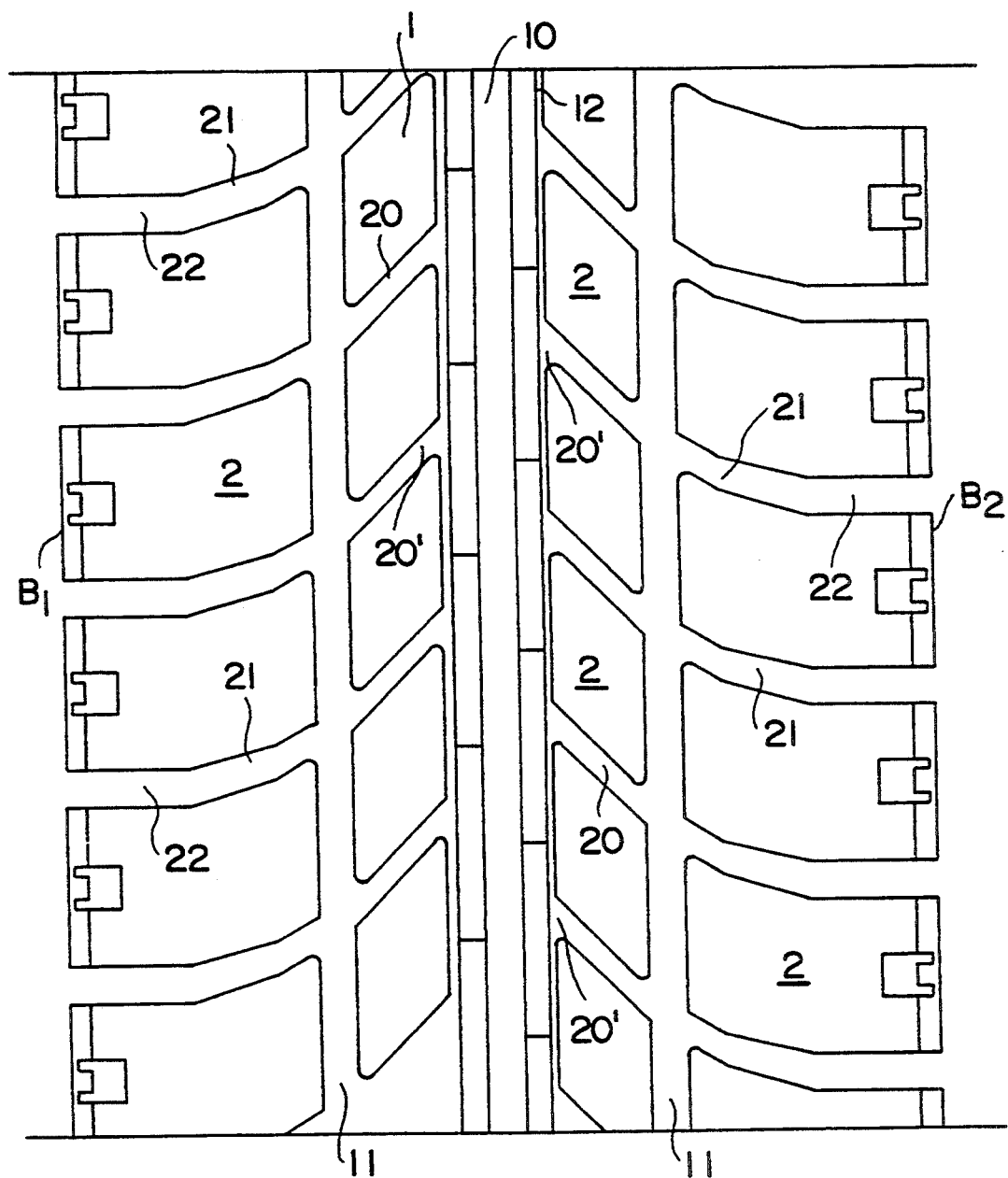
FIG. 1 shows the design of a tread provided with a so-called "V" tread pattern.

The tread 1 of a tire P is provided with a tread pattern comprising a circumferential groove 10 located in the middle of the tread 1 and two lateral wide circumferential grooves 11. Between these grooves 11 and the groove 10 there are also two circumferential grooves 12 of slight width. The grooves 10 and 11 divide the width of the tread 1 into four parts the width of the tread contacting the ground of each part of each of the four parts being approximately equal (see FIG. 3), and form blocks 2 with so-called "V" transverse grooves, which grooves are so called because an examination of their traces on the tire, extending from the edge B1 of the tread to the edge B2, is similar in shape to the letter "V". These grooves are formed of inner portions 20 which are more greatly inclined with respect to the circumferential direction of the tire P and are extended on both sides by portions 21 which are inclined with respect to said circumferential direction but at a smaller angle, outer portions 21 of the tread pattern being completed by grooves 22 which are perpendicular to the circumferential direction. The transverse grooves and the circumferential grooves define blocks 2.

Figure 2:
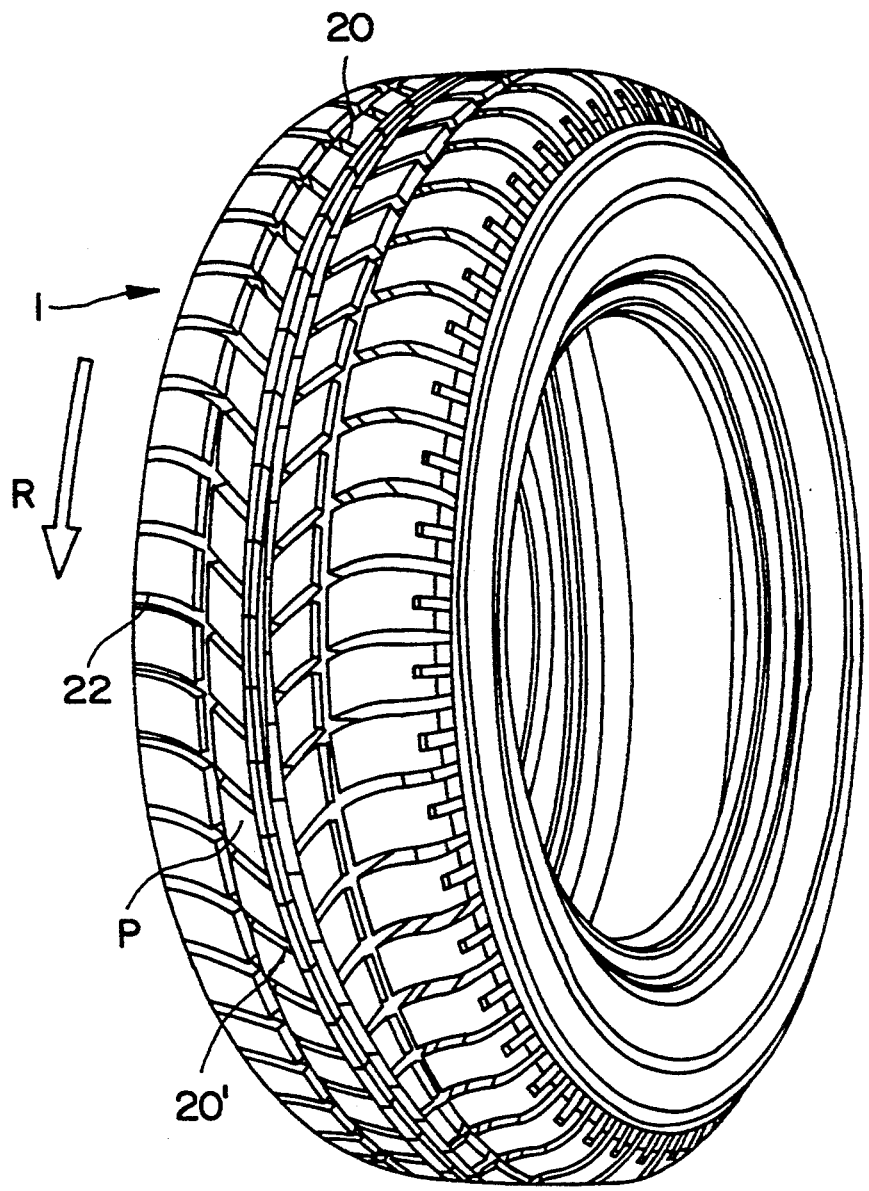
FIG. 2 shows a tire provided with a tread such as shown in FIG. 1, traveling in the so-called "vertex forward" direction.

FIG. 2 shows, in perspective, the tire P with a tread 1 identical to the tread previously described. This tire P is imparted a movement of rotation in the direction of the arrow R so that the axially inner vertices 20' of the transverse grooves 20 penetrate first into the region of contact between the tire and the ground. If the tire P travels in the opposite direction, it is the lateral portions 22 which penetrate first into said region.

Figure 3:
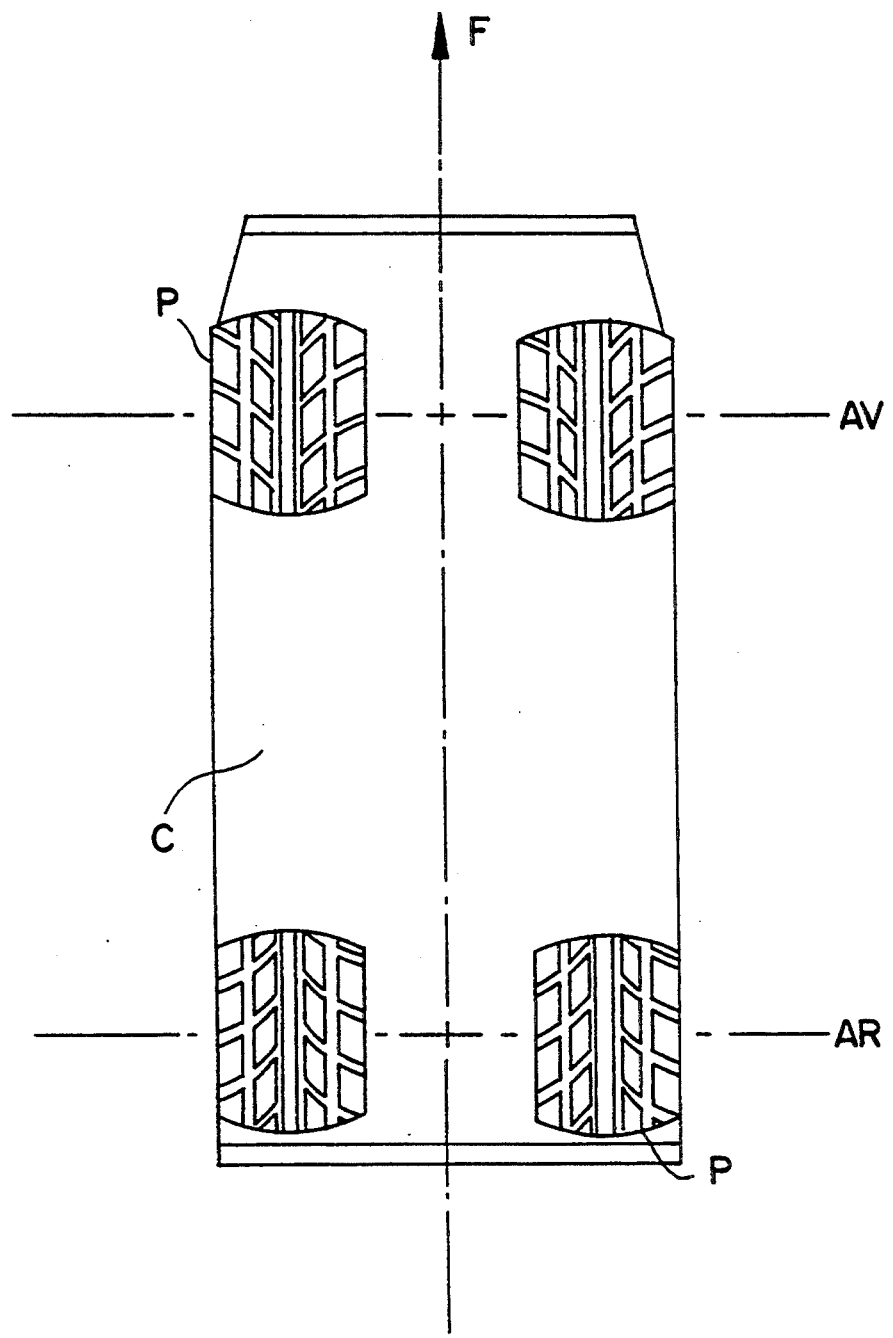
FIG. 3 is a top view of the four tires of a passenger car.

FIG. 3 diagrammatically shows a passenger car C equipped with four tires P the treads 1 of which are identical to that described above. The direction of forward travel of the vehicle is indicated by the arrow F. In accordance with the invention, the tires P on the front axle AV of the vehicle C are imparted a movement of rotation such that the central vertices 20' of the transverse grooves 20 penetrate into the region of contact of the tire after the lateral portions 22. Conversely, the tires P on the rear axle AR of the vehicle C are imparted a movement of rotation such that the central vertices 20' of the transverse grooves 20 penetrate into the region of contact between the tire and the ground before the lateral portions 22 and 21.

In the event that the tires of the front axle above travel "vertex to the rear" and the tires of the rear axle "vertex in front", the equipment thus described permits a decrease in the acoustic power on the order of 50% as compared with equipment which comprises tires the direction of rotation of which is "vertex forward" on the front axle and tires the direction of which is also "vertex forward" on the rear axles. This gain, measured objectively and corresponding to the frequency zone relative to the first harmonic (taking into account only the tread blocks) is appreciable for the occupants of the vehicles, and it is very significant in the case of a subjective test, in which test the sole judge is the occupant.

We claim:

1. A method of reducing noise transferred from the tires to the interior of a highway vehicle by mounting a train of at least four tires on the highway vehicle having at least one front axle and at least one rear axle, each tire comprising a tread provided with a directional tread pattern having at least transverse grooves the traces of which are similar to the shape of a "V" said method comprising the steps of equipping the rear axle or axles of said vehicle with tires having a tread direction of rotation such that the vertices of the "V" grooves enter first into the region of contact between the tire and the ground before the axially outer ends of the grooves and equipping the front axle or axles of the vehicle with tires having a tread direction of rotation such that the vertices of the "V" grooves enter into the tire/ground contact region after the axially outer ends of said grooves, the tread directions of rotation of the tires being considered with respect to the forward travel of the vehicle.

* * * * *